US012663090B1

(12) United States Patent
Yang et al.

(10) Patent No.: US 12,663,090 B1
(45) Date of Patent: Jun. 23, 2026

(54) WATER DISTRIBUTOR

(71) Applicant: Xiamen ShuiZhiSen Sanitary Ware Co., Ltd., Fujian (CN)

(72) Inventors: Deqing Yang, Fujian (CN); Dingyun Wen, Fujian (CN)

(73) Assignee: Xiamen ShuiZhiSen Sanitary Ware Co., Ltd., Fujian (CN)

( * ) Notice: Subject to any disclaimer, the term of this patent is extended or adjusted under 35 U.S.C. 154(b) by 45 days.

(21) Appl. No.: 19/021,231

(22) Filed: Jan. 15, 2025

(51) Int. Cl.
*F16K 11/085* (2006.01)
*F16K 27/06* (2006.01)
*F16K 31/60* (2006.01)

(52) U.S. Cl.
CPC ........ *F16K 11/0856* (2013.01); *F16K 27/065* (2013.01); *F16K 31/602* (2013.01)

(58) Field of Classification Search
CPC ...... F16K 5/0407; F16K 5/0414; F16K 5/188; F16K 11/085; F16K 11/0853; F16K 11/0856; F16K 27/065; F16K 31/602; F16K 31/607; E03C 1/023; E03C 1/042; E03C 2201/30
See application file for complete search history.

(56) References Cited

U.S. PATENT DOCUMENTS 11,808,361 B2 * 11/2023 Yang ..................... E03C 1/023
2016/0340876 A1 * 11/2016 Lin ..................... E03C 1/0408

FOREIGN PATENT DOCUMENTS

CN 213271136 U * 5/2021 ............ F16K 11/076
GB 1222209 A * 2/1971 ............... F16K 5/08

OTHER PUBLICATIONS

Machine English translation of CN213271136 (Year: 2026).*

* cited by examiner

*Primary Examiner* — Hailey K. Do
(74) *Attorney, Agent, or Firm* — Birchwood IP

(57) ABSTRACT

A water distributor, including a main body, a water distribution shaft, a first blocking member, and a second blocking member; two ends of the main body are provided with a groove and a first water outlet respectively; a circumferential side surface of the main body is provided with a second water outlet and a water inlet opposite to each other; the water distribution shaft has a sealing part rotatably fitted in the groove; a first blocking member and a second blocking member are mounted on an end surface and a circumferential side surface of the sealing part respectively; rotation of the sealing part enables the first blocking member and the second blocking member to open/close the first water outlet and the second water outlet respectively.

10 Claims, 7 Drawing Sheets

WATER DISTRIBUTOR

BACKGROUND OF THE INVENTION

The present invention relates to the technical field of toilet and bathroom devices, and in particular, to a water distributor.

A water distributor is a device used for distributing water flow and is commonly found in households. For example, a shower may make use of a water distributor. A water distributor usually comprises one water inlet and multiple water outlets, enabling one water source to be divided into multiple branches, such that water is controllably distributed to different water paths to achieve sharing of a same water source by different devices that use water from the same water source. A water distributor eases the burden on pipe arrangements in a household.

Currently, a simple water distributor has been developed, typically comprising a multi-channel valve body and a valve core movably fitted to the valve body; both the multi-channel valve body and the valve core are disposed inside a main body of the water distributor. Opening and closing of multiple water paths in the valve body are realized through the rotation of the valve core, such that the water path switching function (i.e., water distribution function) is realized. The valve body, due to its multi-channel design, incurs a higher production cost compared to other parts. This kind of valve body also leads to a more complicated internal structure of the water distributor, resulting in lower assembly efficiency, and it is also highly susceptible to the impact of tolerances which may increase the difficulties in assembly. An example of this kind of prior art water distributor is disclosed in CN212616505U titled "THREE-WAY VALVE", where a valve seat disclosed is designed with complicated water paths, necessitating specialized molds for production. Therefore, this kind of prior art water distributor has a complicated structure and involves a high production cost.

BRIEF SUMMARY OF THE INVENTION

The present invention is mainly intended to provide a water distributor to address the problems in the prior art, such that the internal structure of the water distributor is simplified, the production cost is kept low, and the assembly is convenient.

To achieve the above purposes, the present invention provides the following technical solutions:

A water distributor, comprising a main body, a water distribution shaft, a first blocking member, and a second blocking member; a first end and a second end of the main body are provided with a groove and a first water outlet respectively; a circumferential side surface of the main body is provided with a second water outlet and a water inlet oppositely arranged with respect to each other; the first water outlet, the second water outlet, and the water inlet are all in communication with the groove; a first end of the water distribution shaft is formed as a sealing part rotatably fitted in the groove; a first blocking member and a second blocking member are mounted on an end surface and a circumferential side surface of the sealing part respectively; rotation of the sealing part enables the first blocking member and the second blocking member to open/close the first water outlet and the second water outlet respectively; both ends of the sealing part and an inner circumferential side wall of the groove are dynamically sealed even when the sealing part rotates in the groove; a second end of the water distribution shaft is exposed outside the main body.

The second end of the water distribution shaft is connected with a handle lever; the second end of the water distribution shaft is formed as a connecting part; a free end of the connecting part is inserted into and fixed with a rotary knob, a nut is provided inside the rotary knob; the nut is threaded to a fastening screw, and the fastening screw penetrates through the rotary knob and is in threaded connection to the handle lever; a wear-resistant ring is mounted at the first end of the main body; a compression nut is provided inside the main body, the connecting part passes through the compression nut; an inner diameter of the compression nut is smaller than an outer diameter of the sealing part.

First sealing rings are provided at two axial ends of the sealing part respectively, and the first sealing rings are fitted between the circumferential side surface of the sealing part and the inner circumferential side wall of the groove.

A water flow-through groove is formed on the circumferential side surface of the sealing part opposite to the second blocking member; at least one water flow-through hole is formed on the end surface of the sealing part, and said at least one water flow-through hole communicates with the water flow-through groove.

A first mounting groove and a second mounting groove in which the first blocking member and the second blocking member are movably fitted therein respectively are formed on the end surface and the circumferential side surface of the sealing part respectively; a first spring is provided in the first mounting groove, wherein one end of the first spring abuts against an inner bottom side of the first mounting groove and another end of the first spring abuts against the first blocking member; a second spring is provided in the second mounting groove, wherein one end of the second spring abuts against an inner bottom side of the second mounting groove and another end of the second spring abuts against the second blocking member.

The end surface of the sealing part is also provided with a limiting protrusion, and a sliding groove in which the limiting protrusion is movably engaged to slide therein when the sealing part rotates is formed on an inner bottom side of the groove.

The end surface of the sealing part is also provided with a positioning post and a third spring; a plurality of positioning grooves in which the positioning post is selectively engaged with are formed on the inner bottom side of the groove; an elastic force of the third spring acts on the positioning post to enable the positioning post to be movably abutting the inner bottom side of the groove and to be selectively engaged with one of the positioning grooves when the sealing part rotates.

The main body is provided with a first interface, a second interface, and a third interface around the first water outlet, the second water outlet, and the water inlet respectively; the first interface and the second interface contain external threads, and the third interface contains internal threads.

Preferably, the water distributor further comprises an adapter nut and a counter nut; the adapter nut is inserted into the counter nut and is also in threaded connection with the third interface.

Preferably, second sealing rings are provided between a circumferential surface of the adapter nut and an inner circumferential side wall of the third interface, and between the circumferential surface of the adapter nut and an inner circumferential side wall of the counter nut respectively.

By using the technical solutions described above, the present invention has the following technical effects:

1. The main body of the water distributor is directly made into a valve in which a groove is provided inside for the water distribution shaft to rotate; an end surface of the main body is provided with a first water outlet, and a circumferential side surface of the main body is provided with both a second water outlet and a water inlet. Accordingly, user may simply rotate the water distribution shaft to control water communication between the water inlet 14 and the first water outlet 12, and between the water inlet 14 and the second water outlet 13 so as to achieve water path switching.

2. The main body is made as the valve body, and the design of water paths is simpler. Specifically, the main body is made substantially hollow due to the groove which accommodates the water distribution shaft and the water inlet and outlets on the end surface and circumferential side surface of the main body; accordingly, processing and formation of the main body are facilitated, the internal structures of the water distributor are simplified, the production cost can be kept low, and assembly is more convenient.

DETAILED DESCRIPTION OF THE INVENTION

Figure 1:
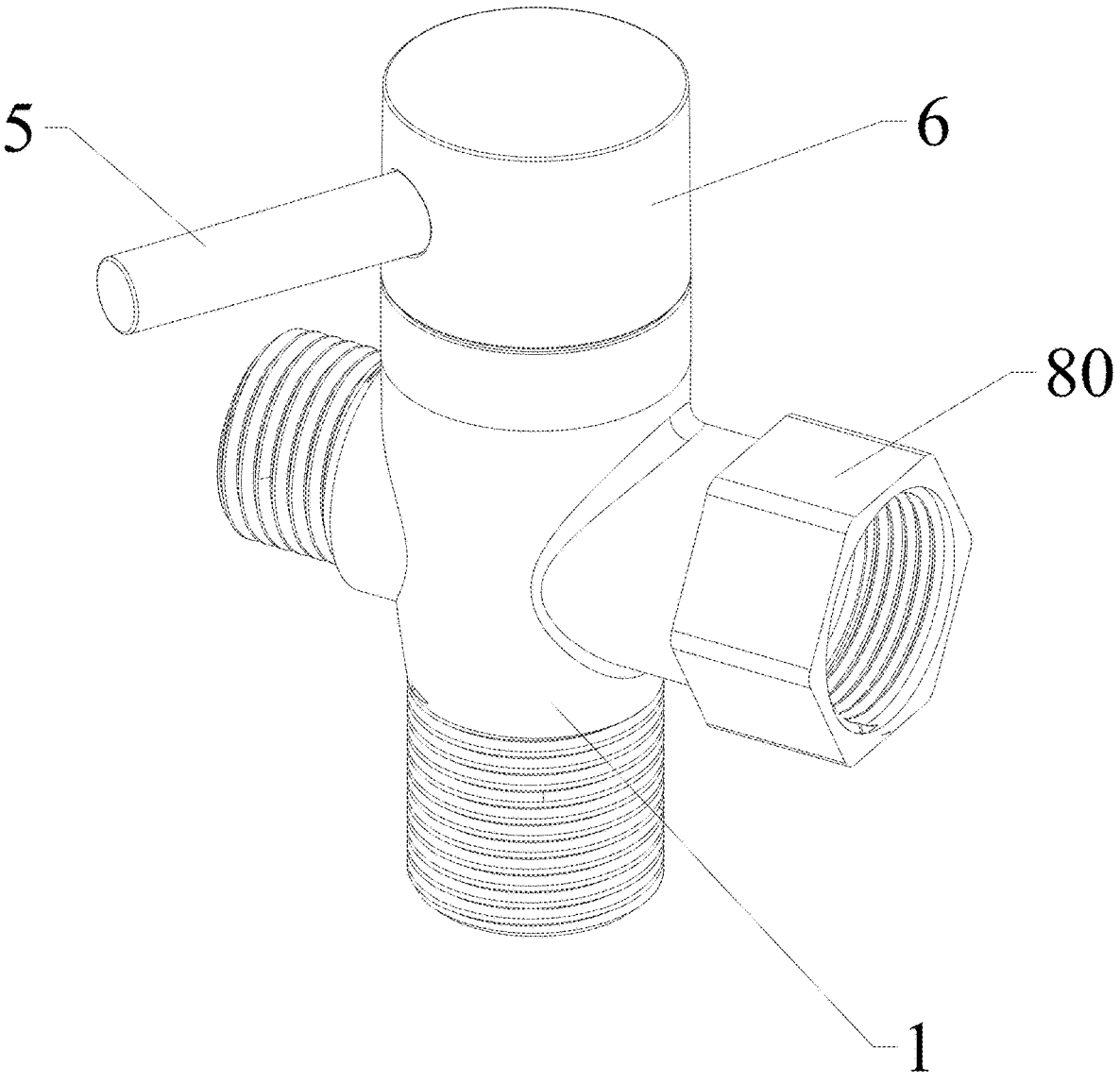
FIG. 1 is a perspective view of a specific embodiment according to the present invention.
Figure 2:
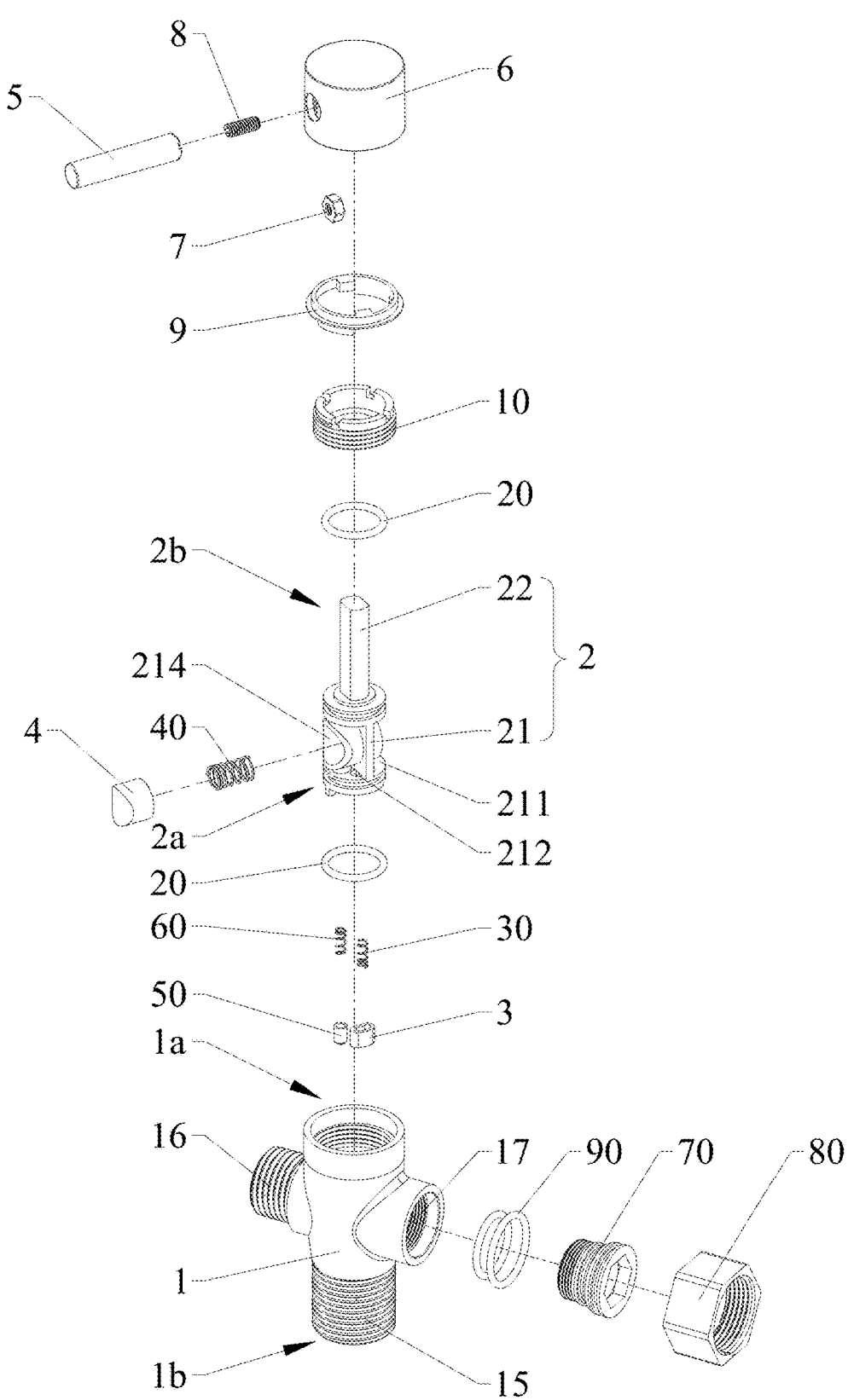
FIG. 2 is an exploded view of a specific embodiment according to the present invention.

To further explain the technical solutions of the present invention, a detailed description of the present invention is provided hereinafter through specific embodiments.

With reference to FIGS. 1-7, a water distributor is disclosed according to the present invention, comprising a main body 1, a water distribution shaft 2, a first blocking member 3, and a second blocking member 4.

A first end 1a and a second end 1b of the main body 1 are provided with a groove 11 and a first water outlet 12 respectively, a circumferential side surface of the main body 1 is provided with a second water outlet 13 and a water inlet 14 oppositely arranged with respect to each other; the first water outlet 12, the second water outlet 13, and the water inlet 14 are all in communication with the groove 11.

A first end 2a of the water distribution shaft 2 is formed as a sealing part 21 rotatably fitted in the groove 11; a first blocking member 3 and a second blocking member 4 are mounted on an end surface and a circumferential side surface of the sealing part 21 respectively. Rotation of the sealing part 21 enables the first blocking member 3 and the second blocking member 4 to open/close the first water outlet 12 and the second water outlet 13 respectively; both ends of the sealing part 21 and an inner circumferential side wall of the groove 11 are dynamically sealed to prevent water leakage even when the sealing part 21 rotates in the groove 11. A second end 2b of the water distribution shaft 2 is exposed outside the main body 1 for user's operation.

Figure 3:
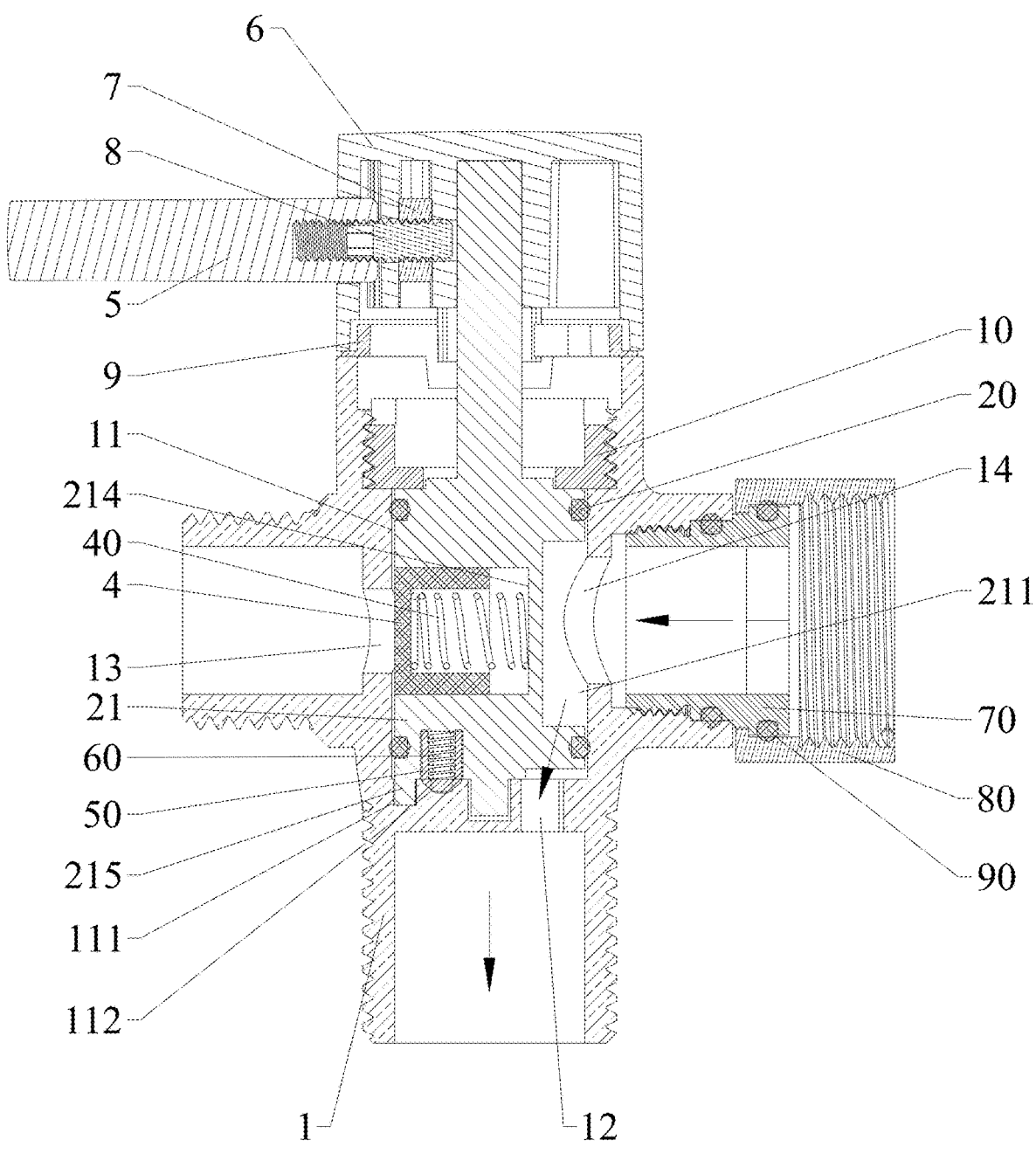
FIG. 3 is a schematic view illustrating water discharging from a first water outlet according to a specific embodiment of the present invention.
Figure 4:
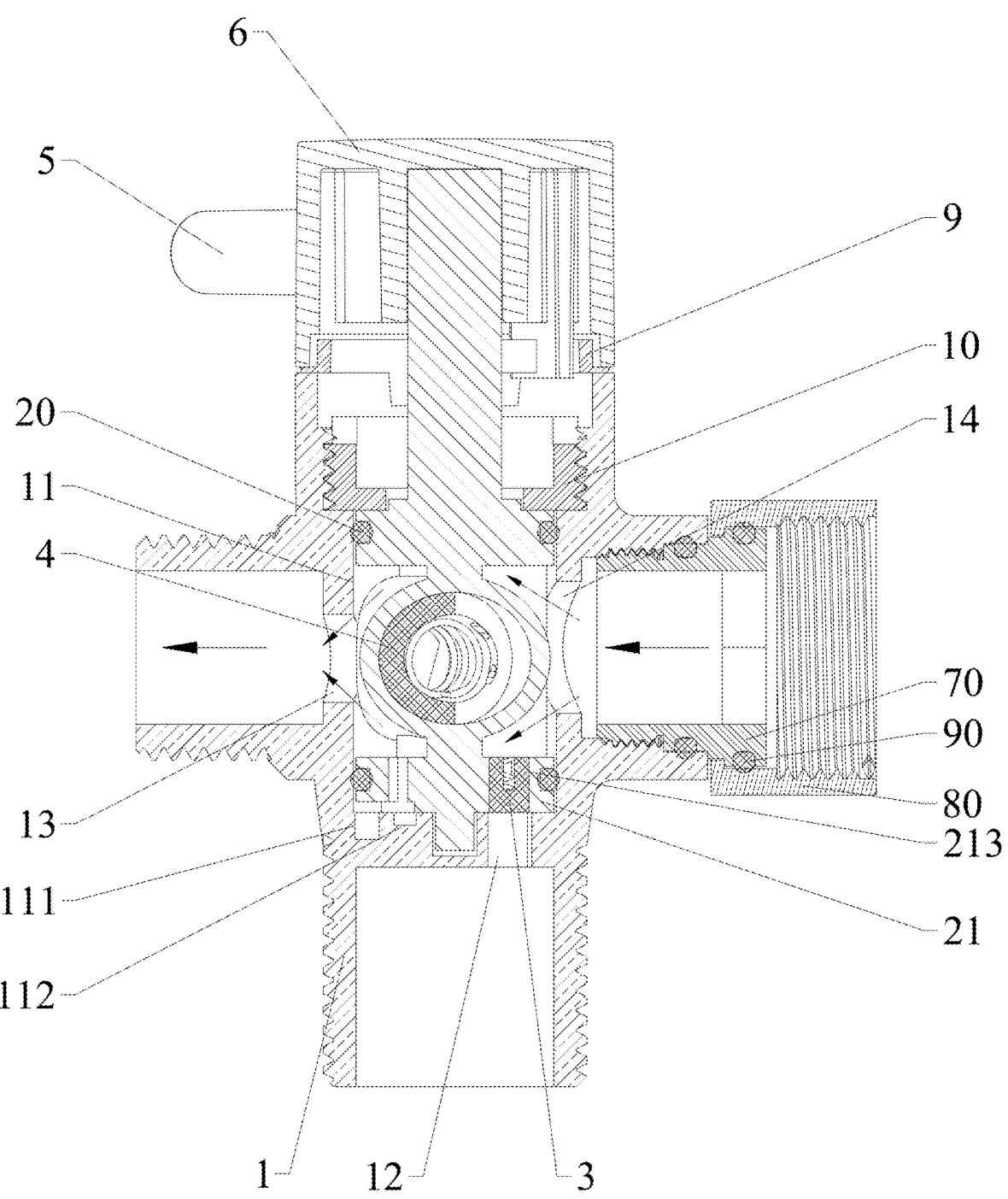
FIG. 4 is a schematic view illustrating water discharging from a second water outlet according to a specific embodiment of the present invention.
Figure 5:
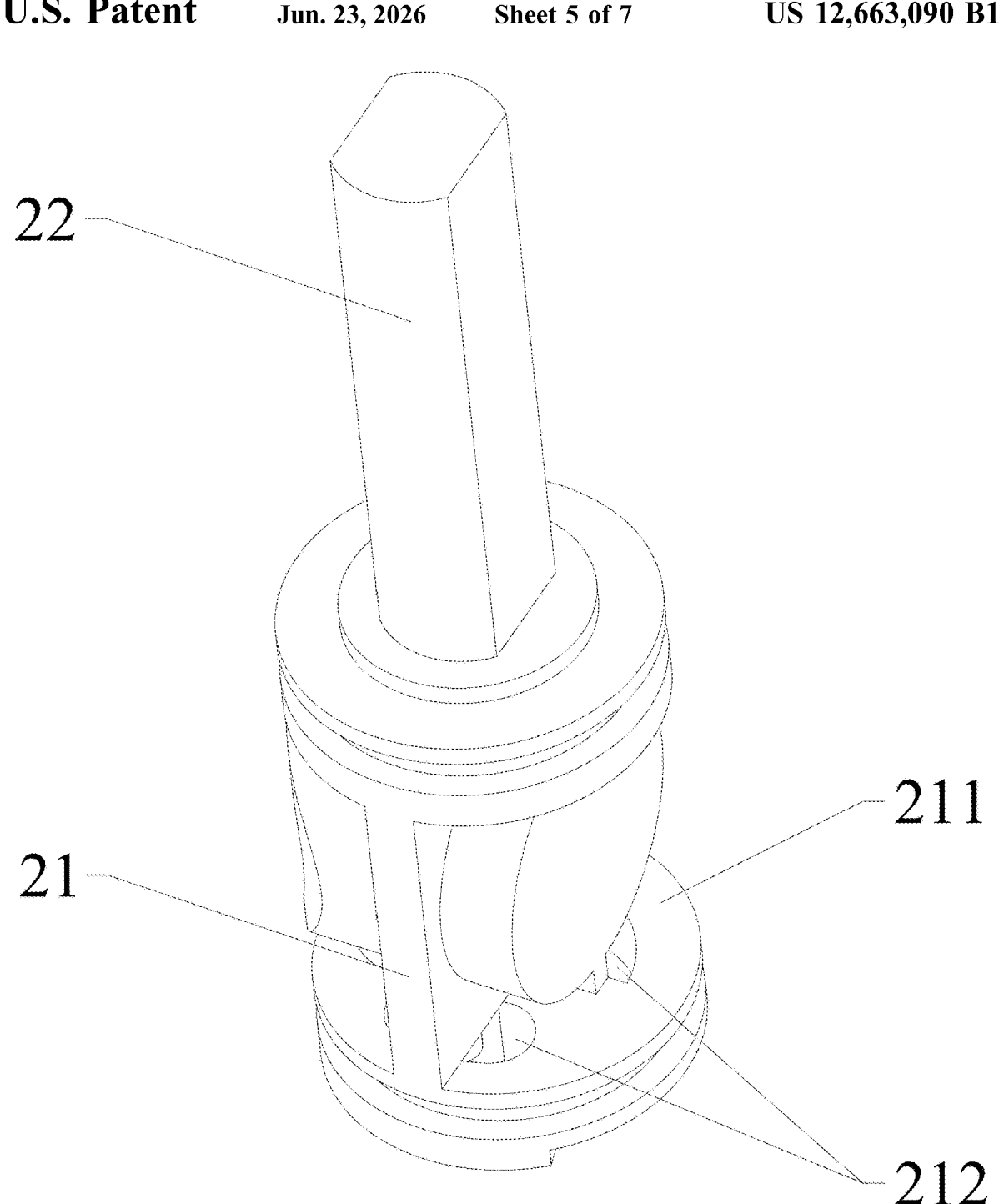
FIG. 5 is a perspective view of a water distribution shaft according to a specific embodiment of the present invention.
Figure 6:
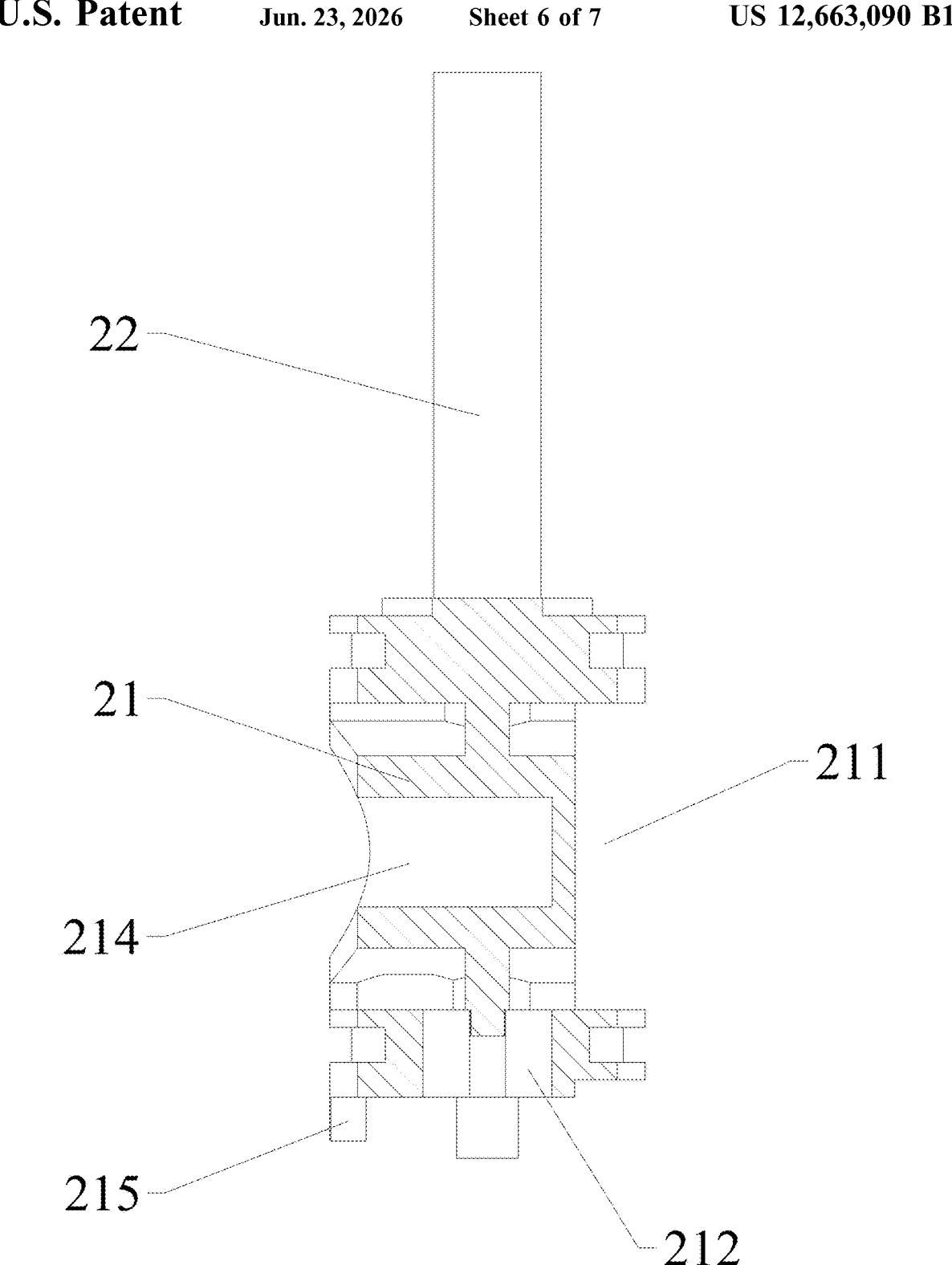
FIG. 6 is an exploded view of the water distribution shaft according to a specific embodiment of the present invention.

According to the above technical solutions, the main body 1 of the water distributor of the present invention is directly designed into a valve body provided with the groove 11, an end surface and the circumferential side surface of the main body 1 are provided with the first water outlet 12 and the second water outlet 13 respectively, and the circumferential side surface of the main body 1 is also provided with the water inlet 14. As shown in FIGS. 3 and 4, a user can control water communication between the water inlet 14 and the first water outlet 12, and between the water inlet 14 and the second water outlet 13, by simply rotating the water distribution shaft 2, so as to realize water path switching. In the present invention, the main body 1 of the water distributor is a valve body, and the water path design is simpler. Specifically, the main body 1 is substantially hollowed out through the provision of the groove 11 and the water inlet and the water outlets designed on end surface and circumferential side surface of the main body 1, as such, the processing and molding of the main body 1 is facilitated, the internal structure of the water distributor is simplified, the production cost can be kept low, and the assembly is convenient.

The following description illustrates the specific embodiments of the present invention.

The second end 2b of the water distribution shaft 2 is connected with a handle lever 5, such that a user can rotate the water distribution shaft 2 more easily.

Further, the second end 2b of the water distribution shaft 2 is formed as a connecting part 22; a free end of the connecting part 22 is inserted into and fixed with a rotary knob 6, a nut 7 is provided inside the rotary knob 6, the nut 7 is threaded to a fastening screw 8, and the fastening screw 8 penetrates through the rotary knob 6 and is in threaded connection to the handle lever 5.

Further, a wear-resistant ring 9 is mounted at the first end 1a of the main body 1 between the main body 1 and the rotary knob 6 to prevent direct contact between the main body 1 and the rotary knob 6, thereby reducing wearing of the main body 1 and the rotary knob 6.

Also, a compression nut 10 is provided inside the main body 1, the connecting part 22 passes through the compression nut 10; an inner diameter of the compression nut 10 is smaller than an outer diameter of the sealing part 21, such that the sealing part 21 cannot pass through the compression nut 10 and is therefore fixed in the groove 11 by the compression nut 10.

First sealing rings 20 are provided at two axial ends of the sealing part 21 respectively, and the first sealing rings 20 are tightly fitted between the circumferential side surface of the sealing part 21 and the inner circumferential side wall of the groove 11 to realize dynamic sealing even when the sealing part 21 rotates in the groove 11.

With reference to FIGS. 2 to 6, a water flow-through groove 211 is formed on the circumferential side surface of the sealing part 21 opposite to the second blocking member 4, such that when the sealing part 21 is rotated to a position where the first blocking member 3 closes the first water outlet 12 but the second blocking member 4 does not close the second water outlet 13, water from the water inlet 14 can flow towards the second water outlet 13 through the water flow-through groove 211, as shown in FIG. 4. Further, at least one water flow-through hole 212 is formed on the end surface of the sealing part 21, and said at least one water flow-through hole 212 communicates with the water flow-through groove 211, such that when the sealing part 21 is rotated to a position where the first blocking member 3 does not close the first water outlet 12 but the second blocking member 4 closes the second water outlet 13, water from the water inlet 14 is allowed to flow towards the first water outlet 12 through the water flow-through groove 211 and said at least one water flow-through hole 212.

A first mounting groove 213 and a second mounting groove 214 in which the first blocking member 3 and the second blocking member 4 are movably fitted therein respectively are formed on the end surface and the circumferential side surface of the sealing part 21 respectively. A first spring 30 is provided in the first mounting groove 213 having one end of the first spring 30 abutting against an inner bottom side of the first mounting groove 213 and another end abutting against the first blocking member 3; a second spring 40 is provided in the second mounting groove 214 having one end of the second spring 40 abutting against an inner bottom side of the second mounting groove 214 and another end abutting against the second blocking member 4. The arrangements of the springs between the sealing part 21 and the blocking members enable more flexible rotation of the sealing part 21 through the elasticity of the springs. Also, the springs' elasticity in cooperation with water pressure enables rapid and effective blocking of a corresponding water outlet.

The end surface of the sealing part 21 is also provided with a limiting protrusion 215, and a sliding groove 111 in which the limiting protrusion 215 is movably engaged to slide therein when the sealing part 21 rotates is formed on an inner bottom side of the groove 11. A length of the sliding groove 111 can limit the rotation of the sealing part 21 (i.e., the water distribution shaft 2), such that the sealing part 21 is being limited to rotate only by a certain degree, and a 360° rotation of the sealing part is prevented.

Figure 7:
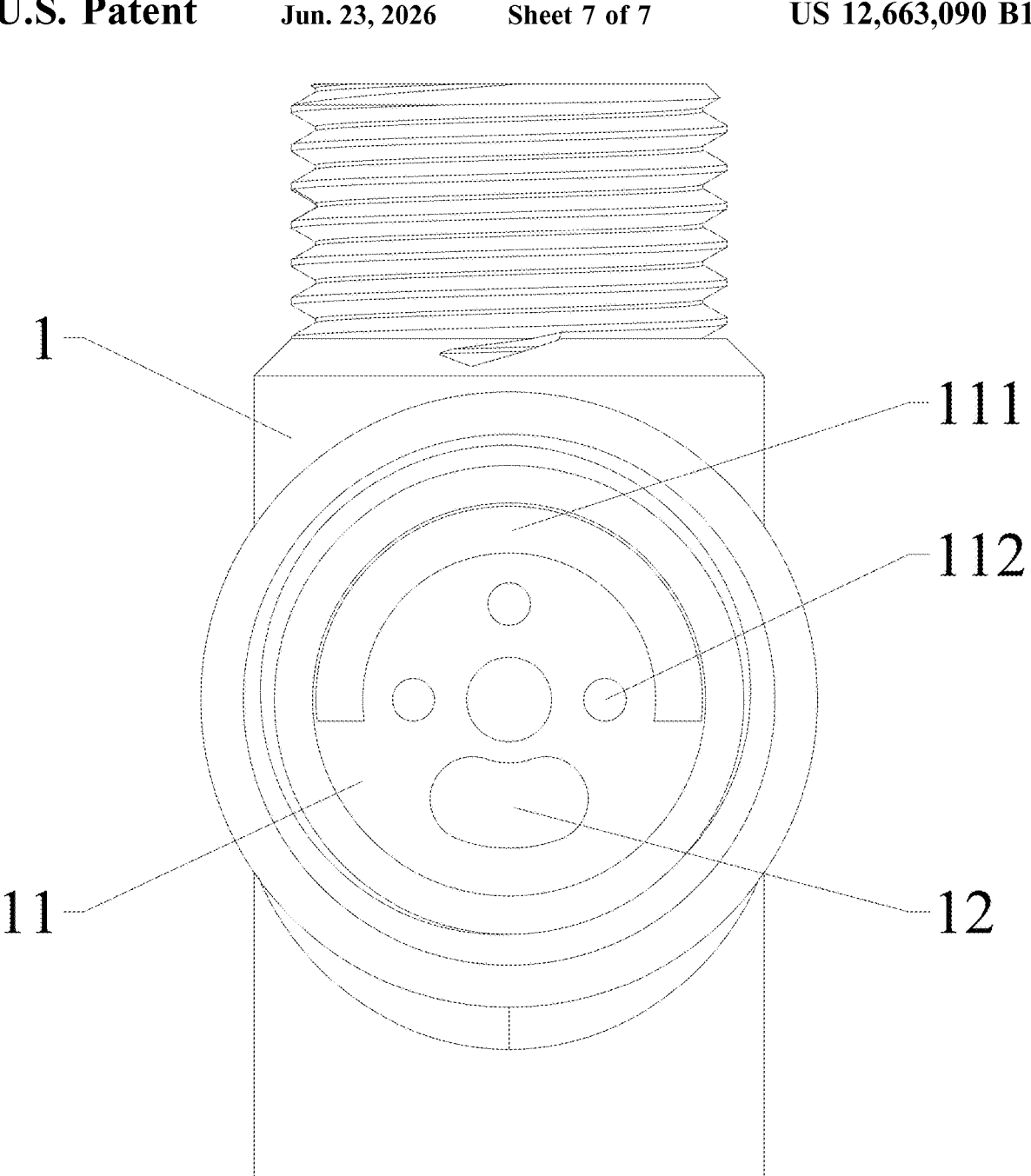
FIG. 7 is a top plan view of a main body according to a specific embodiment of the present invention.

The end surface of the sealing part 21 is also provided with a positioning post 50 and a third spring 60; a plurality of positioning grooves 112 in which the positioning post 50 is selectively engaged with are formed on the inner bottom side of the groove 11; an elastic force of the third spring 60 acts on the positioning post 50 to enable the positioning post 50 to be movably abutting the inner bottom side of the groove 11 and to be selectively engaged with one of the positioning grooves 112 when the sealing part 21 rotates. Engagement of the positioning post 50 into a positioning groove 112 will create a click sound so that a user is being notified of whether the water distribution shaft 2 is rotated to a desired position to open/close desired water outlet(s). According to a specific embodiment as shown in FIG. 7, three positioning grooves 112 may be provided, corresponding to three different status, the first one being closure of the first water outlet 12 and opening of the second water outlet 13, the second one being closure of the second water outlet 13 and opening of the first water outlet 12, and the third one being closure of both the first water outlet 12 and the second water outlet 13.

The main body 1 is provided with a first interface 15, a second interface 16, and a third interface 17 around the first water outlet 12, the second water outlet 13, and the water inlet 14 respectively; the first interface 15 and the second interface 16 contain external threads, and the third interface 17 contains internal threads; accordingly, connections with a pipeline and with different devices using the same water source are facilitated.

Further, the present invention further comprises an adapter nut 70 and a counter nut 80. The adapter nut 70 is inserted into the counter nut 80 and is also in threaded connection with the third interface 17; second sealing rings 90 are provided between a circumferential surface of the adapter nut 70 and an inner circumferential side wall of the third interface 17, and between the circumferential surface of the adapter nut 70 and an inner circumferential side wall of the counter nut 80 respectively, so as to realize circumferential sealing which provides better sealing effect, and water leakage caused by poor connection can be avoided.

The above embodiments and illustrations are not intended to limit the form and style of the product of the present invention. Any appropriate variations or modifications made by those of ordinary skill in the art shall be considered as falling within the scope of patent of the present invention.

What is claimed is:

1. A water distributor, comprising:
   a main body, a water distribution shaft, a first blocking member, and a second blocking member;
   a first end and a second end of the main body are provided with a groove and a first water outlet respectively; a circumferential side surface of the main body is provided with a second water outlet and a water inlet oppositely arranged with respect to each other; the first water outlet, the second water outlet, and the water inlet are all in communication with the groove;
   a first end of the water distribution shaft is formed as a sealing part rotatably fitted in the groove; the first blocking member and the second blocking member are mounted on an end surface and a circumferential side surface of the sealing part respectively; rotation of the sealing part enables the first blocking member and the second blocking member to open/close the first water outlet and the second water outlet respectively; both ends of the sealing part and an inner circumferential side wall of the groove are dynamically sealed even when the sealing part rotates in the groove; a second end of the water distribution shaft is exposed outside the main body.

2. The water distributor of claim 1, wherein the second end of the water distribution shaft is connected with a handle lever; the second end of the water distribution shaft is formed as a connecting part; a free end of the connecting part is inserted into and fixed with a rotary knob, a nut is provided inside the rotary knob; the nut is threaded to a fastening screw, and the fastening screw penetrates through the rotary knob and is in threaded connection to the handle lever; a wear-resistant ring is mounted at the first end of the main body; a compression nut is provided inside the main body, the connecting part passes through the compression nut; an inner diameter of the compression nut is smaller than an outer diameter of the sealing part.

3. The water distributor of claim 1, wherein first sealing rings are provided at said both ends of the sealing part respectively, and the first sealing rings are fitted between the circumferential side surface of the sealing part and the inner circumferential side wall of the groove.

4. The water distributor of claim 1, wherein a water flow-through groove is formed on the circumferential side surface of the sealing part opposite to the second blocking member; at least one water flow-through hole is formed on the end surface of the sealing part, and said at least one water flow-through hole communicates with the water flow-through groove.

5. The water distributor of claim 1, wherein a first mounting groove and a second mounting groove in which the first blocking member and the second blocking member are movably fitted therein respectively are formed on the end surface and the circumferential side surface of the sealing part respectively; a first spring is provided in the first mounting groove, wherein one end of the first spring abuts against an inner bottom side of the first mounting groove and another end of the first spring abuts against the first blocking member; a second spring is provided in the second mounting groove, wherein one end of the second spring abuts against an inner bottom side of the second mounting groove and another end of the second spring abuts against the second blocking member.

6. The water distributor of claim 1, wherein the end surface of the sealing part is also provided with a limiting protrusion, and a sliding groove in which the limiting protrusion is movably engaged to slide therein when the sealing part rotates is formed on an inner bottom side of the groove.

7. The water distributor of claim 1, wherein the end surface of the sealing part is also provided with a positioning post and a third spring; a plurality of positioning grooves in which the positioning post is selectively engaged with are formed on an inner bottom side of the groove; an elastic force of the third spring acts on the positioning post to enable the positioning post to be movably abutting the inner bottom side of the groove and to be selectively engaged with one of the plurality of positioning grooves when the sealing part rotates.

8. The water distributor of claim 1, wherein the main body is provided with a first interface, a second interface, and a third interface around the first water outlet, the second water outlet, and the water inlet respectively; the first interface and the second interface contain external threads, and the third interface contains internal threads.

9. The water distributor of claim 8, further comprising an adapter nut and a counter nut; the adapter nut is inserted into the counter nut and is also in threaded connection with the third interface.

10. The water distributor of claim 9, wherein second sealing rings are provided between a circumferential surface of the adapter nut and an inner circumferential side wall of the third interface, and between the circumferential surface of the adapter nut and an inner circumferential side wall of the counter nut respectively.

\* \* \* \* \*